United States Patent [19]
Ikeda et al.

[11] Patent Number: 5,009,732
[45] Date of Patent: Apr. 23, 1991

[54] METHOD OF MANUFACTURING MEMBER FOR USE IN TIRE INCLUDING ENGAGING WIRES BETWEEN GEARS

[75] Inventors: Kazunari Ikeda; Koichi Sanada, both of Tokyo, Japan

[73] Assignee: Bridgestone Corporation, Tokyo, Japan

[21] Appl. No.: 344,647

[22] Filed: Apr. 28, 1989

[51] Int. Cl.$^5$ .............................................. B29C 65/00
[52] U.S. Cl. .................... 156/177; 156/179; 156/439
[58] Field of Search ............... 156/176, 177, 178, 179, 156/436, 437, 439, 555, 906; 264/168; 428/229, 295, 369

[56] References Cited

U.S. PATENT DOCUMENTS

| | | | |
|---|---|---|---|
| 1,742,777 | 1/1930 | Midgley | 156/179 |
| 1,800,179 | 4/1931 | Darrow | 156/177 |
| 3,053,717 | 9/1962 | Bright | 156/179 |
| 3,511,739 | 5/1970 | Hebberling | 156/179 |
| 3,512,230 | 5/1970 | Luzzatto | 264/168 |
| 3,700,012 | 10/1972 | Alderfer | 156/436 |
| 3,941,637 | 3/1976 | Masuda et al. | 156/436 |
| 4,064,915 | 12/1977 | Buyssens et al. | 428/229 |
| 4,124,425 | 11/1978 | Rye et al. | 156/437 |
| 4,600,456 | 7/1986 | Oswald | 156/177 |

FOREIGN PATENT DOCUMENTS

| | | |
|---|---|---|
| 47-13684 | 7/1972 | Japan . |
| 47-20807 | 10/1972 | Japan . |
| 47-34576 | 11/1972 | Japan . |
| 52-8084 | 1/1977 | Japan . |
| 52-91967 | 8/1977 | Japan . |
| 61-502877 | 12/1986 | Japan . |
| 0018495 | of 1909 | United Kingdom ................ 156/179 |
| 0770037 | 3/1957 | United Kingdom ............ 242/155 R |
| 0964102 | 7/1964 | United Kingdom ............ 242/147 R |
| 1099169 | 1/1968 | United Kingdom ............ 242/155 R |

*Primary Examiner*—Michael W. Ball
*Assistant Examiner*—Steven D. Maki
*Attorney, Agent, or Firm*—Sughrue, Mion, Zinn, Macpeak & Seas

[57] ABSTRACT

A method of manufacturing a member such as a reinforcing member for use in a tire includes steps of arranging wires in a predetermined spaced relationship one to the others by means of a guide plate, extending the wires about rolls of a winding type brake unit, and aligning the wires by passing them through a comb roll. The method further includes steps of engaging the wires between a pair of gears arranged immediately downstream of the comb roll and driven at equal speeds to be set in wave-shapes, arranging the wires in a belt-shape in an appropriate width as a whole by means of a concaved roll, extending the wires about flat rolls to cause the wave-shapes of the wires to fall down onto a plane, and then coating the wires with a rubber. The member of the tire thus produced is uniform in quality and has a large elongation and improved anti-cutting property.

10 Claims, 4 Drawing Sheets

FIG_1
PRIOR ART
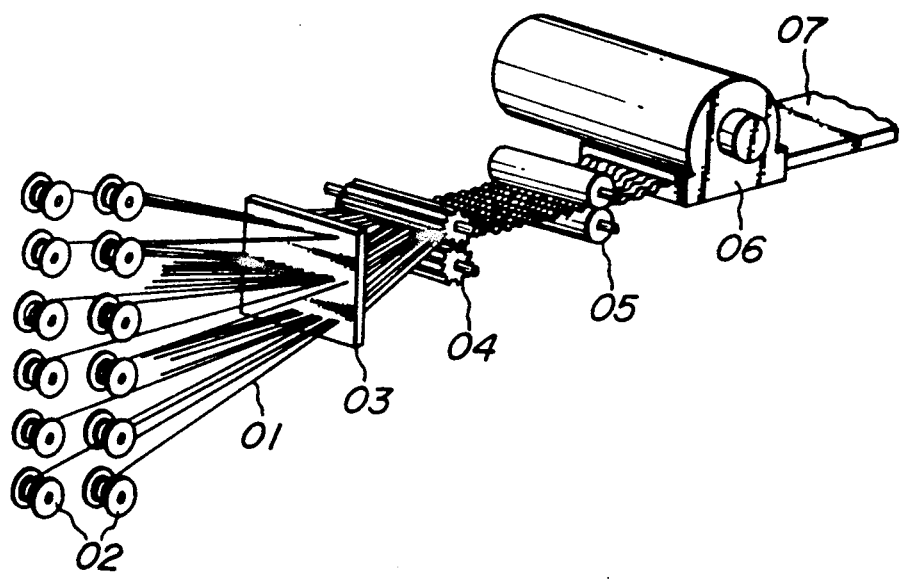
FIG_2
PRIOR ART

FIG_5
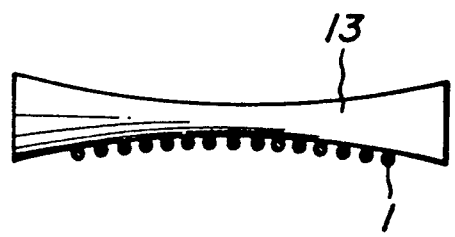
FIG_6
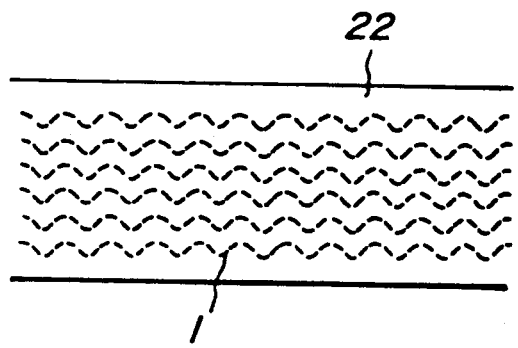

METHOD OF MANUFACTURING MEMBER FOR USE IN TIRE INCLUDING ENGAGING WIRES BETWEEN GEARS

BACKGROUND OF THE INVENTION

This invention relates to a method of manufacturing a member for use in a tire, particularly a reinforcing member superior in anti-cutting property and having an elongation not affecting tire performances.

Rubber members having wires embedded therein have been widely used as elastic members having anti-cutting property for various purposes. In a case that such rubber members are used as reinforcing members for products such as tires subjected to various external forces, wires embedded in the members are required to have elongations to an extent that do not detrimentally affect tire performance.

It has been proposed to permanently set wires in wave shapes to be embedded in rubber members. Such rubber members have been used as reinforcing members whose producing method has already been disclosed in Japanese Patent Application Laid-open No. 52-8,084.

Such a method of the prior art will be explained by referring to FIG. 1.

In the example of the prior art, filament wires 01 are used, which are wound about bobbins 02 rotatably supported and paid out thereof toward a guide plate 03.

The guide plate 03 is formed with a number of small apertures arranged in three rows vertically spaced from each other. In each row, the apertures are equally spaced. The wires 01 pass through the apertures in each of rows so as to be arranged in a plane. The wires 01 are then introduced between a pair of gear rollers 04.

The wires 01 in the three rows guided by the gear rollers 04 are alternately combined into a single plane and forced between the pair of gear rollers 04 into wave-shaped wires in vertical planes thereby changed from straight wires.

Thereafter, the wave-shaped wires pass between flat or smooth cylindrical rollers 05 so that the waves of the wires in the vertical planes will fall down into a horizontal plane to become two dimensional horizontal waves. The wires formed in horizontal waves are then fed into an extruder 06. The wires are coated with a rubber on their upper and lower sides and extruded from the extruder 06 to form a rubber member 07.

The series of processes above described are performed by pulling the rubber member 07 having the wire 01 embedded therein on an exhaust side of the extruder 06.

In these processes, if all the plurality of wires 01 do not have constant tensile forces immediately before entering between the gear rollers 04, stable permanent sets or deformations in wave shapes could not be accomplished, resulting in irregular waves of wires with high probability.

In the prior art, it is not clear that the bobbins 02 for winding the wires 01 thereon have brake means. Even if they have such means, it is very difficult to maintain equal tensile forces in all the wires 01 between the plurality of bobbins 02 and the gear rollers 04.

Therefore, it is difficult to obtain uniform waves of wires by means of the gear rollers 04. Rubber members 07 formed to include such non-uniform waves would have locally different extending forces so that they could not exhibit sufficient effect expected as reinforcing members.

Moreover, although the guide plate 03 is arranged upstream of the gear roller 04 to arrange the wires 01 in order, there is a tendency of the wires to be disturbed more or less immediately before entering between the gear rollers 04. Thus, positional relations between the wires 01 are apt to become unequal.

This is acute in the case where wires 01 are stranded wires. Such disturbances result from displacements of the wires caused by jerking action of the gear rollers at the moment when the wires enter between the gear rollers because of the absence of any regulating means immediately before the gear rollers.

Sinusoidal waves are the most preferable as the waveforms to be set in the wires because of their minimum decrease in tensile strength. In order to obtain waveforms similar to the sinusoidal waves it is needed to positively rotatively drive the pair of gear rollers 04 at the equal speeds to positively form the waves. In the prior art, however, the upper and lower gear rollers 04 are in general driven by the wires being pulled in downstream directions for shaping the wires into the waveforms. Therefore, the upper and lower gear rollers 04 do not necessarily rotate at equal speeds and teeth of the upper and lower gear rollers 04 do not maintain their predetermined positional relationship. Accordingly, crests of the waves formed in the wires are shifted onto either the upstream or downstream side as shown in FIG. 2.

SUMMARY OF THE INVENTION

It is a primary object of the invention to provide a method of manufacturing a member for use in a tire, which eliminates all the disadvantages of tires produced by the method of the prior art and includes wires having waves uniform in shape and interval and is superior in extensibility and durability.

In order to achieve this object, the method of manufacturing members for use in tires comprises steps of arranging wires in predetermined spaced relationship one to the others by means of a guide plate, extending the wires about rolls of a winding type brake unit, aligning the wires by passing them through a comb roll, engaging the wires between a pair of gears arranged immediately downstream of the comb roll and driven at equal speeds to be set in water-shapes, arranging the wires in a belt-shape in an appropriate width as a whole by passing the wires through a concaved roll, extending the wires about flat rolls to cause the wave-shapes of the wires to fall down onto a plane, and then coating the wires with a rubber.

By the use of the winding type brake unit, all the wires can be maintained under constant tensile forces between the brake unit and the gears, so that the permanent sets of the wires are uniformly accomplished by means of the gears. Moreover, by providing the comb roll immediately before the gears, the wires are arranged without jamming of the wires between the gears so that all the wave-shapes of the wires are substantially the same and positional relations between the wires are uniformly maintained.

Moreover, as the pair of the gears themselves are positively rotatively driven at substantially the equal speeds, the wires are formed into substantially sinusoidal wave-shapes.

Accordingly, the wires in the form of the substantially the same wave-shapes are embedded in the rubber bodies in the rubber coated and uniformly aligned state, thereby improving the effect of tire members having elongations and the like.

The invention will be more fully understood by referring to the following detailed specification and claims taken in connection with the appended drawings.

BRIEF DESCRIPTION OF THE DRAWINGS

FIG. 1 is a perspective view of an apparatus of the prior art for manufacturing members for use in tires;

FIG. 2 is a drawing illustrating a wave-shape formed by a method of the prior art;

FIG. 5 illustrates the concaved roll used in the method according to the invention; and FIG. 6 is a plan view illustrating a tire member manufactured by the method according to the invention.

DETAILED EXPLANATION OF THE PREFERRED EMBODIMENTS

Figure 3:
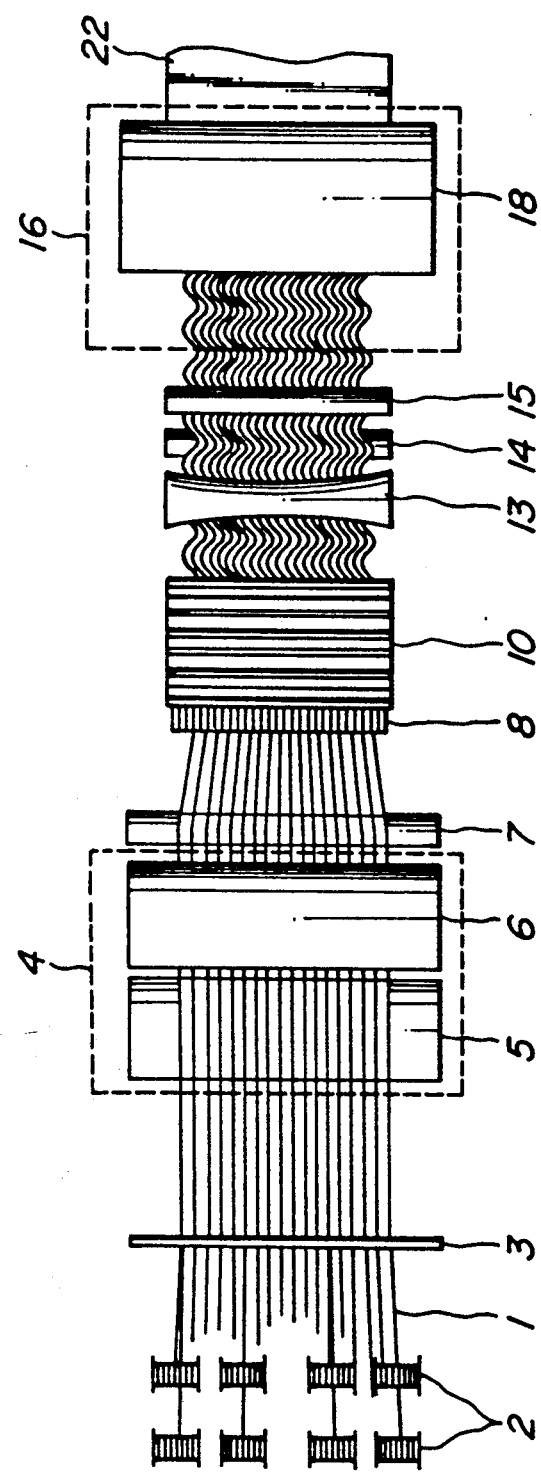
FIG. 3 is a plan view of an apparatus for carrying out the method of the invention.
Figure 4:
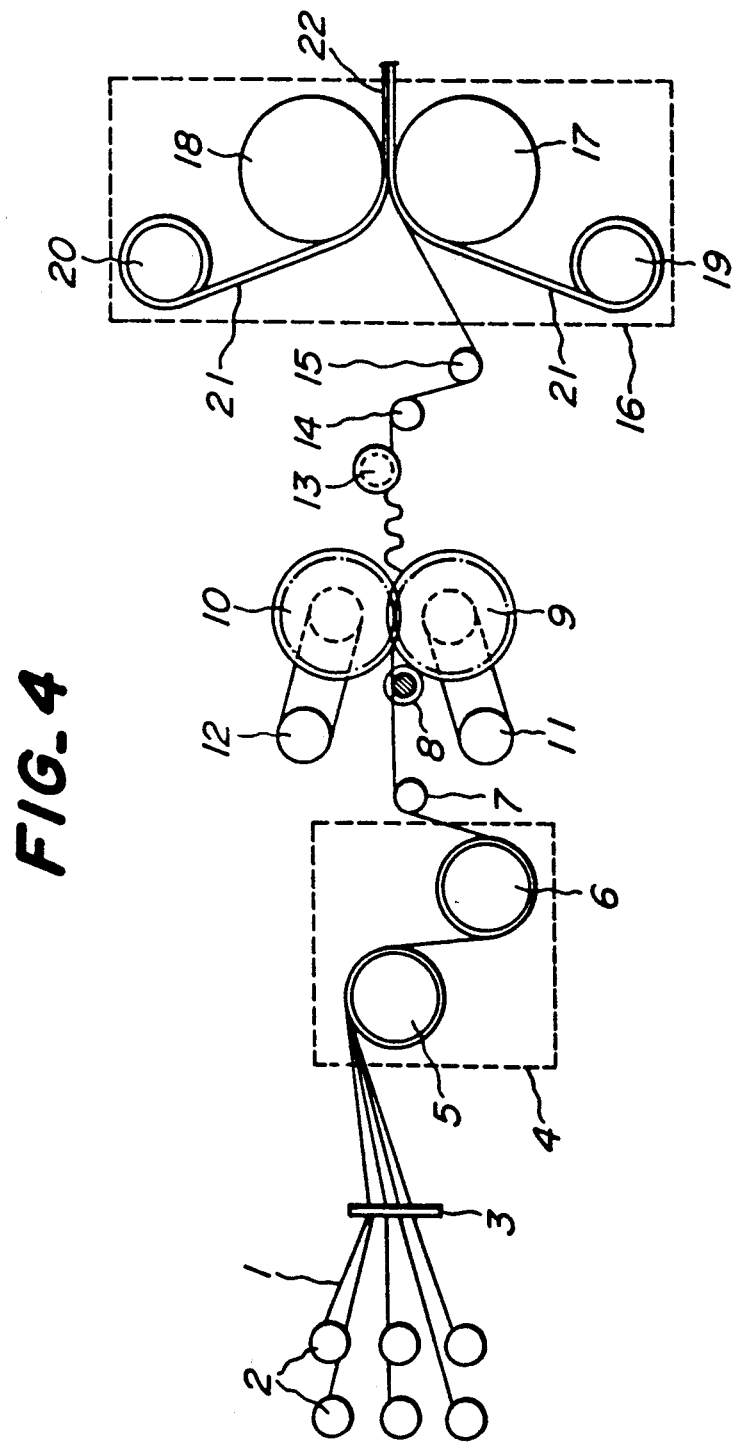
FIG. 4 is a side view of the apparatus shown in FIG. 3.

FIG. 3 illustrates in a plan view an apparatus for carrying out of the method according to one embodiment of the invention and FIG. 4 is a side view of the apparatus shown in FIG. 2.

Wires 1 are stranded wires wound about a plurality of bobbins 2 on an upstream side (left side in FIGS. 3 and 4). The wires 1 may be filaments.

The wires 1 paid out of the bobbins 2 are drawn toward a guide plate 3 and pass through a plurality of apertures formed in position in the guide plate 3.

The wires 1 passed through the apertures of the guide plate 3 extend about winding rolls 5 and 6 of a winding type brake unit 4. The wires 1 are wound about the winding roll 5 from above approximately over a quarter of its circumference and then wound about the winding roll 6 over a lower half of its circumference and fed therefrom.

The wires 1 are kept in predetermined positional relations to each other by passing through the apertures of the guide plate 3 and combined in alignment with each other with equal intervals in the same plane just as the wires are about to be wound around the winding roll 5.

When the winding rolls 5 and 6 are forced to rotate by pulling the wires 1 downstream of the brake unit 4, braking action obstructing the rotation of the rolls naturally always occurs in the rolls. Therefore, the wires 1 being pulled toward the downstream side are always subjected to constant tensile forces.

On the other hand, the winding rolls 5 and 6 have large diameters and include rubber coated outer surfaces for the purpose of increasing their coefficient of friction. As a result, any slip of the wires relative to the rolls 5 and 6 is prevented owing to the long contacting lengths of the wires with the surfaces of the rolls 5 and 6 resulting from the large diameters of the rolls 5 and 6 in conjunction with the large coefficient of friction therebetween, thereby maintaining sufficient tensile forces of the wire on the downstream side of the braking unit 4.

The wires 1 leaving the winding roll 6 are maintained horizontally by means of a roll 7 and arrive at a comb roll 8 rotatably supported and having teeth of comb planted round about therein with equal intervals. Therefore, the wires 1 are snugly arranged one in each clearance between the teeth of comb and fed under such an aligned state to a pair of setting gears 9 and 10 arranged one above the other in a next stage.

In this case, immediately before entering between the setting gears 9 and 10, an adhesive tape is attached to a leading end of the entire wires 1 in its width direction on a downstream side of the comb roll 8.

When the wires 1 are about to be embraced between the setting gears 9 and 10, the wires 1 are apt to be irregularly displaced by forces acting on the wires 1 from the setting gears 9 and 10. However, such displacements of the wires are prevented or regulated by arranging the comb roll 8 closely to the setting gears 9 and 10 as shown in FIGS. 3 and 4. With stranded wires, particularly, the wires are subjected to external forces in indefinite directions by embracing the wires 1 between teeth of the setting gears 9 and 10 so that the stranded wires are likely to be irregularly shifted. However, such a shifting of the stranded wires is prevented by the comb roll 8 arranged closely to the setting gears 9 and 10.

Moreover, at a moment when leading ends of the wires 1 have left the setting gears 9 and 10, they tend to advance in various directions. Such indefinite movements of the wires 1 are prevented by the adhesive tape attached to the leading end of the entire wires 1 to always keep the wires 1 in a snugly arranged condition.

The setting gears 9 and 10 are rotatively driven in opposite directions at the same speeds by driving means 11 and 12 so that opposed teeth of the setting gears are in mesh with but not contact with each other to form constant sinusoidal wave shaped clearances between the teeth in mesh with each other.

Therefore, the wires 1 embraced or clamped between the teeth are forced to be set into correct sinusoidal wave-shapes whose crests are not shifted onto the upstream or downstream side.

The wires 1 formed in the sinusoidal wave-shapes having amplitudes of waves in vertical directions tend, in general, to diverge so as to widen their distances between the adjacent wires at the exit of the setting gears 9 and 10. In order to prevent such a divergence of the wires 1, a concave roll 13 is provided along which wires 1 are guided to keep their intervals constant in a constant overall width of the wires 1 (FIG. 5). The wires 1 under such a snug condition are fed to flat rolls 14 and 15 in a next station so as to extend about these flat rolls.

The flat rolls 14 and 15 are freely rotatably journaled. The wires 1 extend about the upstream flat roll 14 over approximately a quarter of its circumference in a clockwise direction viewed in FIG. 4. Thereafter, the wires 1 extend about the downstream flat roll 15 over approximately a quarter of its circumference in a counterclockwise direction and are then fed to a calender 16.

The wires 1 are pulled from the downstream side to be wound about the flat rolls 14 and 15 so that the wave-shapes of the wires 1 are laid down onto outer flat surfaces of the flat rolls 14 and 15 in a two dimensional plane.

In such an operation, the leading ends of the wires 1 simultaneously fall down in unison in either of width directions of the rolls without falling down in random fashion because of the leading ends being fastened by the adhesive tape. Remaining portions of the wires continuous with the leading ends also fall down in that direction in which the leading ends fell down so that the wires 1 leaving the flat rolls 14 and 15 are arranged with equal intervals in the plane in sinusoidal waves equal in period and phase to each other.

The arranged wires 1 are then fed into a calender 16 in a next station to be coated with rubber on their upper and lower sides. The calender 16 comprises upper and lower impression rolls 17 and 18 and upper and lower feeding rolls 19 and 20 for feeding rubber sheets 21 between the impression rolls 17 and 18. With this arrangement, the wires 1 are embraced between the upper and lower rubber sheets 21 and firmly pressed therebetween by uniform pressure in width directions applied by the impression rolls 17 and 18, so that the upper and lower rubber sheets are integrally adhered with each other to complete a tire reinforcing member 22 together with the wires 1.

In the prior art using an extruder, in coating wires with rubber, an alignment jig (inserter) is provided which is formed with apertures arranged in position. In this case, the wires are caused to pass through the apertures of the alignment jig so as to be snugly arranged and then caused to pass in rubber flowing in the extruder. However, the flows (pressures) of the rubber are different between centers and both side edges in width directions. As a result, there is a risk of the aligned wires being disturbed into irregular positions.

Moreover, when the wires are caused to pass through the apertures of the inserter, the wires are often elongated to same extent so that amplitudes of the waves of the wires formed on the upstream side become smaller to reduce elongations of the complete tire member.

In contrast herewith, according to the invention using the calender the wires are embraced by upper and lower rubber sheets so that the aligned wires can be embedded in the rubber bodies without being disturbed, thereby ensuring a large elongation of the completed member.

The tire reinforcing member 22 completed as above described includes the sinusoidal waves of wires 1 snugly aligned in the plane as shown in FIG. 6 so that the complete reinforcing member exhibits uniformly a large elongation and is superior in durability and anticutting property.

Although the stranded wires are used in the embodiment above described, filaments may of course be used for the same purpose. On the other hand, stranded wires are advantageous in comparison with non-stranded or filament wires in that stranded wires rarely cause breaking or disconnection in being set into wave-shapes and thinner wires can be used for the same strength.

According to the invention wires are set in waveshapes by means of a pair of gears all positively driven under constant tension with the aid of the winding type brake unit. Therefore, the wires are formed in substantially sinusoidal wave-shapes. Moreover, as the comb rolls are used to keep the wires in aligned condition, the wires formed in substantially sinusoidal wave-shapes can be embedded in snugly aligned positional relation in rubber bodies.

Accordingly, the produced tire member is uniform in quality and has a large elongation and improved anticutting property. The tire members produced according to the invention can be applied as high elongation tire reinforcing members to tires of wide ranges.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of manufacturing a member for use in a tire, comprising steps of arranging wires in a predetermined spaced relationship one to the others by means of a guide plate, extending the wires about rolls of a winding brake unit, aligning the wires by passing them through a comb roll, engaging the wires between a pair of gears arranged immediately downstream of the comb roll and driven at equal speeds to set said wires in waveshapes, arranging the wires in a belt-shape in an appropriate width as a whole by passing the wires about a concaved roll, extending the wires about flat rolls such that the wave-shapes of the wires fall onto a common plane and do not touch each other, and then coating the wires with rubber.

2. A method of manufacturing a member for use in a tire as set forth in claim 1, wherein the rolls of the winding brake unit are driven by the wires passing therethrough by pulling the wires on a downstream side.

3. A method of manufacturing a member for use in a tire as set forth in claim 1, wherein in extending the wires about rolls of the winding brake unit, the wires are wound about a first roll from above approximately over a quarter of a circumference of the first roll and then about a second roll over a lower half of a circumference of the second roll.

4. A method of manufacturing a member for use in a tire as set forth in claim 1, wherein in aligning the wires by the use of said comb roll, the wires are arranged one in each clearance between teeth of comb planted round about the comb roll.

5. A method of manufacturing a member for use in a tire as set forth in claim 1, wherein in setting the wires in the wave-shapes by the use of the pair of gears, the wires are set in the shapes in wave-shaped clearances between teeth of the pair of gears which are separately driven at equal speeds so that they are in mesh with each other keeping substantially uniform clearances between the teeth without contacting each other.

6. A method of manufacturing a member for use in a tire as set forth in claim 1, wherein in causing the waveshapes of the wires to fall down by means of the flat rolls, the wires are extended about an upstream flat roll over approximately a quarter of a circumference of the first flat roll and then about a downstream flat roll over approximately a quarter of a circumference of the second flat roll.

7. A method of manufacturing a member for use in a tire as set forth in claim 1, wherein in coating the wires with the rubber, the wires are embraced between upper and lower rubber sheets fed from upper and lower rubber sheet feeding rolls by uniform pressure applied by upper and lower impression rolls.

8. A method of manufacturing a member for use in a tire as set forth in claim 1, wherein immediately before feeding the wires into the pair of gears, an adhesive tape is attached to a leading end of all of the wires wherein, said wave-shapes of said wires simultaneously fall onto said plane in unison due to attachment of said wires.

9. An apparatus for manufacturing a member for use in a tire, comprising a guide plate for arranging wires in a predetermined spaced relationship one to the others when the wires pass therethrough, a winding brake unit having rolls about which the wires extend, a comb roll for aligning the wires when they pass therethrough, a pair of gears arranged immediately downstream of the comb roll and driven at equal speeds for setting the wires in wave-shapes when the wires are engaged between the gears, a concaved roll for arranging the wires in a belt-shape in an appropriate width as a whole when the wires pass thereabout, flat rolls for causing the wave-shapes of the wires to fall onto a common plane without touching each other when the wires pass the flat rolls, and a calender in which the wires are coated on upper and lower sides with rubber.

10. A method of manufacturing a member for use in a tire as set forth in claim 1, wherein in passing the wires about the concaved roll, said wires set in wave-shapes are caused to pass the concave roll and in contact therewith so that an overall width of the wires as a whole narrows to arrange said wires to a suitable width while preventing the wave shapes of said wires from falling in a random manner.

* * * * *